June 9, 1942.   F. D. SNYDER   2,285,687
REVERSING MEANS FOR SINGLE-PHASE MOTORS
Filed Aug. 5, 1940
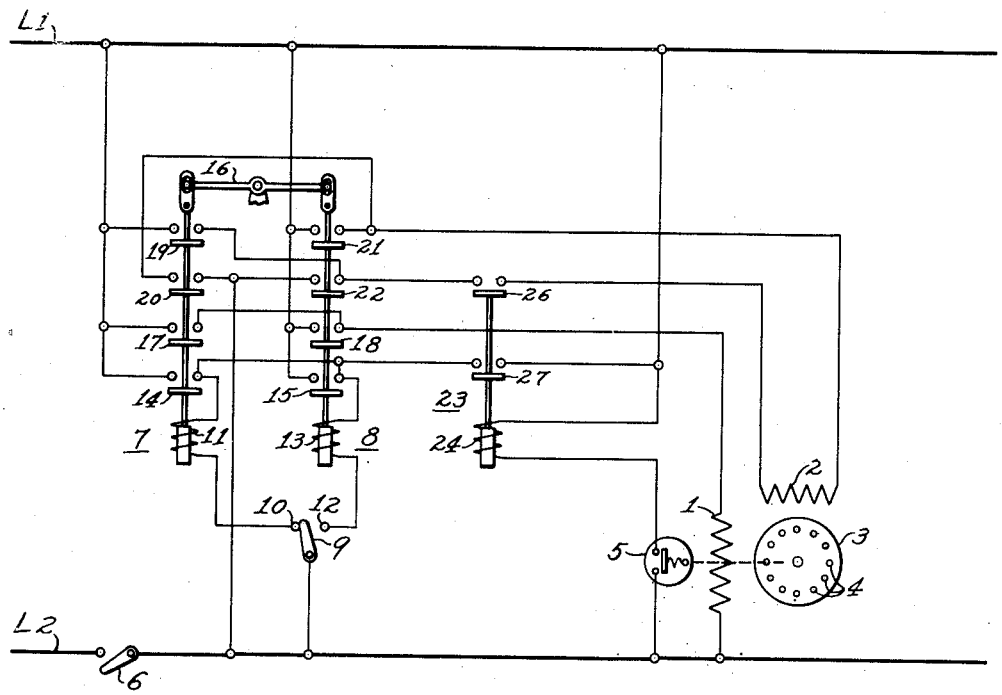
WITNESSES:
INVENTOR
Frederick D. Snyder.
BY
ATTORNEY Patented June 9, 1942

2,285,687

UNITED STATES PATENT OFFICE 2,285,687

REVERSING MEANS FOR SINGLE-PHASE MOTORS

Frederick D. Snyder, East Milton, Mass., assignor to Westinghouse Electric & Manufacturing Company, East Pittsburgh, Pa., a corporation of Pennsylvania Application August 5, 1940, Serial No. 351,536

9 Claims. (Cl. 172—278)

The present invention relates to the control of single-phase induction motors, and more particularly to a control system for reversing such motors.

Single-phase induction motors usually have a main or running primary winding and an auxiliary or starting primary winding, which are physically displaced from each other on the stator of the motor and which carry currents which are displaced in phase. In starting, both windings are connected in parallel to a supply line, and the phase displacement between their currents is usually produced either by the design of the windings, as in the split-phase motor, or by connecting a capacitor in series with the starting winding, as in the capacitor motor. A centrifugal or other type of speed-responsive switch is usually provided which disconnects the starting winding when the motor has come up to about 70 or 80% of its rated speed, after which the motor continues to operate on its main winding alone.

In order to reverse such a motor, it is necessary to reverse the connections of one of the windings with respect to the other in order to produce a torque in the opposite direction. If it is attempted to do this while the motor is running, however, merely reversing the connections of one of the windings has no effect since the starting winding is disconnected by the centrifugal switch, and reversing the connections of the main winding while the motor is running does not affect the direction of rotation. In order to reverse a single-phase motor, therefore, it has been necessary to disconnect the motor from the line and then to wait until it has slowed down to the point where the centrifugal switch closes its contacts, which is usually about 20 to 30% of the rated speed, after which a reversing switch can be operated to reverse the connections of the starting winding with respect to the main winding, and thus reverse the motor. This necessary delay before the reversing switch can be operated is undesirable and very troublesome in many applications, but no satisfactory means for reversing a single-phase motor without this delay has heretofore been available.

The principal object of the present invention, therefore, is to provide a control system for reversing a single-phase induction motor which will permit the motor to be readily reversed with only one manual operation.

A further object of the invention is to provide a control system for a single-phase induction motor by means of which the motor can be reversed while running merely by operating a reversing switch without the necessity of waiting for the motor to slow down.

A more specific object of the invention is to provide a control system for reversing a single-phase induction motor in which it is only necessary to operate a reversing switch, after which the motor is deenergized until it slows down and the connections for reverse operation are then made automatically.

Other objects and advantages of the invention will be more fully understood from the following detailed description, taken in connection with the accompanying drawing, the single figure of which is a wiring diagram showing a preferred embodiment of the invention.

The drawing shows a control system for reversing a single-phase motor having a main winding 1 and an auxiliary winding 2. The motor has a rotor member 3 of any suitable type, which carries a secondary winding shown as a squirrel-cage winding 4 of the usual type. The main and auxiliary windings 1 and 2 are displaced from each other on the stator of the motor, and a phase displacement is produced between the currents in the two windings in order to provide a starting torque. The motor shown in the drawing is shown as being of the split-phase type in which the phase displacement between the currents in the two windings is produced by designing the windings with different ratios of resistance to reactance, but it will be understood that the invention may be applied equally well to any other type of single-phase motor, such as a capacitor motor, in which the phase displacement between the currents in the two windings is produced by connecting a capacitor in series with the auxiliary winding. The motor is also provided with a centrifugal switch 5 of any usual type which is designed to open its contacts when the motor has speeded up to a high enough speed and to close its contacts when the speed of the motor falls below a predetermined value, which is usually about 30% of the rated speed.

The motor and control system are energized from a single-phase supply-line L1—L2 through a line switch 6. The windings of the motor are connected to the line by means of either a forward contactor 7 or a reverse contactor 8, and a selector or reversing switch 9 is provided to selectively connect one or the other of these contactors to the line for energization. The selector switch 9 has two positions, a forward position shown in the drawing, in which it is on the contact 10 which connects the operating coil 11 of the forward contactor 7 to the line L2, and a reverse position in which the switch is on the contact 12 which connects the operating coil 13 of the reverse contactor 8 to the line L2. The operating coil 11 of the contactor 7 is also connected through a holding contact 14 on its contactor to the line L1, and the coil 13 of the contactor 8 is similarly connected through a holding contact 15 on its contactor to the line L1, so that when either contactor has been energized, its holding contact maintains its coil energized and the contactor remains closed until the switch 9 is operated to interrupt the circuit to its coil. A mechanical interlock, indicated diagrammatically at 16, is provided to prevent closing of either contactor if the other one is closed, so that it is impossible for both contactors to be closed at the same time. Any suitable type of mechanical interlock may be used for this purpose, or if desired, an electrical interlock of any usual type could be utilized.

One end of the main winding 1 is connected directly to the line L2 while the other end is connected to the line L1 through one or the other of the contactors 7 or 8. This connection is made through a contact 17 on the contactor 7 or a contact 18 on the contactor 8. Each of the contactors also has two other contacts for connecting the auxiliary winding 2 to the line. Thus the contactor 7 has contacts 19 and 20, to which the auxiliary winding 2 is connected, and which complete the circuits for connecting this winding across the line. The contactor 8 has contacts 21 and 22, to which the auxiliary winding 2 is also connected, and which complete other circuits for connecting the winding 2 across the line with its connections reversed from those established by the contactor 7, so that the direction of rotation of the motor when it is connected to the line through the contactor 8 is reversed from its direction of rotation when connected through the contactor 7.

The initial energization of the contactors 7 and 8 and of the auxiliary winding 2 is controlled by a relay 23 which has an operating coil 24 connected across the supply line in series with the centrifugal switch 5. The relay 23 has a contact 26 in series with the auxiliary winding 2, and a contact 27 which is connected to complete a circuit from the line L1 to the operating coils 11 and 13 of the contactors 7 and 8, respectively. The energization of the relay 23 is controlled by the centrifugal switch 5 which is connected in series with its operating coil 24, and the relay functions to effect the initial energization of one or the other of the contactors 7 and 8 according to the position of the switch 9, and to control the circuit of the starting winding 2 to connect it to the line during the starting period and to disconnect it when the motor has come up to speed.

The operation of this reversing system is as follows: Assuming that the motor is at rest with the centrifugal switch 5 closed and the line switch 6 open, the relay 23 and the contactors 7 and 8 will be in their deenergized positions with all the contacts open, as shown in the drawing. In order to start the motor, with the selector switch 9 on the contact 10, for example, to give the desired direction of rotation, the line switch 6 is closed. As soon as the switch 6 is closed, the coil 24 of the relay 23 is energized, since the centrifugal switch 5 is closed with the motor at rest. The relay 23, therefore, immediately closes its contacts 26 and 27. Closing of the contact 27 completes a circuit from the line L1 to the operating coil 11 of the contactor 7, the contact 10 and switch 9 to the line L2, so that the contactor 7 is energized and closes its contacts. Closing of the holding contact 14 connects the coil 11 directly across the line through the selector switch 9 to hold the contactor closed. Closing of the contact 17 connects the main winding 1 directly across the line, while closing of the contacts 19 and 20 connects the auxiliary winding 2 across the line in parallel with the main winding, since the contact 26, which is in series with the winding 2, is now closed. Since both windings are energized, the motor will start to run and will accelerate in the forward direction of rotation. When the motor has come up to about 70 or 80% of its normal speed, the centrifugal switch 5 opens its contacts, thus deenergizing the relay 23, which drops out, opening the contacts 26 and 27. Opening of the contact 26 disconnects the starting winding 2 from the line, so that the motor continues to run on the main winding 1 alone. Opening of the contact 27 has no effect at this time, since the contactor 7 is held in by its holding contact 14 and the motor continues to operate on the main winding 1.

If it is now desired to reverse the motor, it is only necessary to throw the selector switch 9 from the contact 10 to the contact 12. As soon as the switch opens at the contact 10, the coil 11 is deenergized and the contactor 7 opens. In case the switch 9 makes contact at 12 before the contacts of the contactor 7 have parted, the coil 13 might be momentarily energized through the contact 14, but the interlock 16 prevents the contactor 8 from closing at this time, and as soon as the contactor 7 has fully opened, this circuit is interrupted. Thus both contactors 7 and 8 are opened, and the motor is, therefore, entirely disconnected from the line so that it begins to slow down. When the motor has slowed down to a relatively low speed, the centrifugal switch 5 closes its contacts, thus again energizing the coil 24 of the relay 23, and causing the relay to close its contacts. Closing of the contact 27 completes the circuit for energizing the coil 13 of the contactor 8 which, therefore, closes its contacts. Closing of the holding contact 15 completes an energizing circuit for the coil 13 to hold the contactor in, while closing of the contact 18 connects the main winding 1 across the line in the same direction as before. Closing of the contacts 21 and 22 connects the auxiliary winding 2 across the line, but with its connections reversed from the previous connections. Since the contact 26 is now closed, both windings are energized and a torque will be produced which is opposite in direction to the previous direction of rotation. This reverse torque will rapidly bring the motor to rest and accelerate it in the reverse direction. As soon as the motor has come up to speed in the reverse direction, the switch 5 will open to deenergize the relay 23 and cause it to open its contacts. As before, opening of the contact 26 disconnects the starting winding 2, and the contactor 8 is held in by its holding contact 15, so that the main winding remains connected to the line and the motor continues to rotate in the reverse direction.

It should now be apparent that a control system has been provided for reversing a single-phase motor which is relatively simple and which automatically performs the necessary operations for reversing the motor, so that it is only necessary to operate the reversing switch and the necessary changes in connections of the motor are then carried out automatically, thus avoiding the necessity of waiting until the motor has slowed down before the reversing switch can be operated. This control system can obviously be applied to any type of single-phase motor, and may be used for any kind of reversing service, whether manually or automatically operated.

A preferred embodiment of the invention has been shown and described in order to illustrate the principles involved, but it will be apparent that various modifications and other embodiments of the invention are possible, and it is to be understood, therefore, that the invention is not limited to the particular arrangement shown and described, but in its broadest aspect it includes all equivalent modifications and embodiments which come within the scope of the appended claims.

I claim as my invention:

1. A single-phase motor having a main primary winding and an auxiliary primary winding, a contactor for establishing circuit connections for connecting said windings to a supply line for rotation of the motor in one direction, a second contactor for establishing other circuit connections for connecting said windings to the supply line for rotation of the motor in the reverse direction, switch means for selecting one or the other of said contactors, an auxiliary-contact means for controlling the energization of said contactors, a holding-contact on each contactor in bypassing relation to said auxiliary-contact means, and speed-responsive means for actuating said auxiliary-contact means to closed-circuit position when the motor is below a predetermined speed.

2. A single-phase motor having a main primary winding and an auxiliary primary winding, a contactor for connecting said windings to a supply line for rotation of the motor in one direction, a second contactor for connecting said windings to the supply line for rotation of the motor in the reverse direction, switch means for selecting one or the other of said contactors, a first auxiliary-contact means for controlling the energization of said contactors, a second auxiliary-contact means in series with the auxiliary winding, a holding-contact on each contactor in bypassing relation to said first auxiliary-contact means, and speed-responsive means for actuating said first and second auxiliary-contact means to closed-circuit position when the motor is below a predetermined speed.

3. A single-phase motor having a main primary winding and an auxiliary primary winding, a contactor for establishing circuit-connections for connecting said windings to a supply line for rotation of the motor in one direction, a second contactor for establishing other circuit connections for connecting said windings to the supply line for rotation of the motor in the reverse direction, means for preventing either one of said contactors from closing when the other one is closed, switch means for selecting one or the other of said contactors, an auxiliary-contact means for controlling the energization of said contactors, a holding-circuit means for each contactor in bypassing relation to said auxiliary-contact means, and speed-responsive means for actuating said auxiliary-contact means to closed-circuit position when the motor is below a predetermined speed.

4. A single-phase motor having a main primary winding and an auxiliary primary winding, a contactor for connecting said windings to a supply line for rotation of the motor in one direction, a second contactor for connecting said windings to the supply line for rotation of the motor in the reverse direction, means for preventing either one of said contactors from closing when the other one is closed, switch means for selecting one or the other of said contactors, a first auxiliary-contact means for controlling the energization of said contactors, a second auxiliary-contact means in series with the auxiliary winding, a holding-circuit means for each contactor in bypassing relation to said first auxiliary-contact means, and speed-responsive means for actuating said first and second auxiliary-contact means to closed-circuit position when the motor is below a predetermined speed.

5. A control system for a single-phase induction motor having a main primary winding and an auxiliary primary winding, comprising a forward contactor for connecting said windings in parallel to a supply line, a reverse contactor for connecting said windings in parallel to the supply line with the connections of one of them reversed, each of said contactors having a holding contact for maintaining itself energized, a switch for selecting one or the other of said contactors for energization, a relay having a contact for effecting energization of said contactors and a contact in series with the auxiliary winding, said relay being normally deenergized with its contacts open, and speed-responsive means for energizing said relay when the speed of the motor is less than a predetermined value.

6. A control system for a single-phase induction motor having a main primary winding and an auxiliary primary winding, comprising a forward contactor for connecting said windings in parallel to a supply line, a reverse contactor for connecting said windings in parallel to the supply line with the connections of one of them reversed, each of said contactors having a holding contact for maintaining itself energized, means for preventing said contactors from both being closed at the same time, a switch for selecting one or the other of said contactors for energization, a relay having a contact for effecting energization of said contactors and a contact in series with the auxiliary winding, said relay being normally deenergized with its contacts open, and speed-responsive means for energizing said relay when the speed of the motor is less than a predetermined value.

7. A single-phase induction motor having a main primary winding and an auxiliary primary winding, said windings beng displaced from each other and their currents being displaced in phase, a first contactor for connecting said windings in parallel to a supply line, a second contactor for connecting said windings to the supply line with the connections of one of them reversed, a reversing switch for selectively energizing one or the other of said contactors, an auxiliary switching-means for completing an initial energizing circuit for said contactors, each of said contactors having a holding-means for maintaining itself in its running-position, said auxiliary switching-means also controlling the circuit of said auxiliary winding, and means for causing said auxiliary switching-means to be actuated only when the motor is at rest or running below a predetermined speed.

8. A single-phase induction motor having a main primary winding and an auxiliary primary winding, said windings being displaced from each other and their currents being displaced in phase, a first contactor for connecting said windings in parallel to a supply line, a second contactor for connecting said windings to the supply line with the connections of one of them reversed, means preventing said contactors from both being closed at the same time, a reversing switch for selectively energizing one or the other of said contactors, an auxiliary switching-means for completing an initial energizing circuit for said contactors, each of said contactors having a holding-means for maintaining itself in its running-position, said auxiliary switching-means also controlling the circuit of said auxiliary winding, and means for causing said auxiliary switching-means to be actuated only when the motor is at rest or running below a predetermined speed.

9. A single-phase induction motor having a main primary winding and an auxiliary primary winding, said windings being displaced from each other and their currents being displaced in phase, a first contactor for connecting said windings in parallel to a supply line, a second contactor for connecting said windings to the supply line with the connections of one of them reversed, means preventing said contactors from both being closed at the same time, a reversing switch for selectively energizing one or the other of said contactors, a first auxiliary-contact means for completing an initial energizing circuit for said contactors, a second auxiliary-contact means for controlling the circuit of said auxiliary winding, each of said contactors having a holding-means for maintaining itself in its running-position, and a speed-responsive means for actuating said first and second auxiliary-contact means to closed-circuit position when the motor is below a predetermined speed.

FREDERICK D. SNYDER.